UNITED STATES PATENT OFFICE.

OSCAR BALLY, OF MANNHEIM, GERMANY, ASSIGNOR TO THE BADISCHE ANILIN & SODA FABRIK, OF LUDWIGSHAFEN, GERMANY, A CORPORATION OF GERMANY.

GREEN DYE OF THE ANTHRACENE SERIES.

SPECIFICATION forming part of Letters Patent No. 688,576, dated December 10, 1901.

Application filed October 16, 1900. Serial No. 33,281. (No specimens.)

*To all whom it may concern:*

Be it known that I, OSCAR BALLY, doctor of philosophy, a citizen of the Swiss Republic, residing at Mannheim, in the Grand Duchy of Baden, Germany, have invented new and useful Improvements in Coloring-Matters of the Anthracene Series, of which the following is a specification.

This invention relates to the new green coloring-matter which can be obtained by treating the product of Letters Patent No. 656,081, granted August 14, 1900, with bromin or chlorin, which are equivalent bodies for the purposes of this invention, and submitting this result to the action of an aromatic amin, such as anilin, paratoluidin, &c. The so-obtained halogen product is itself a coloring-matter, and so is the product obtained by treatment with an aromatic amin. This last product can also be converted into a sulfonated form in the ordinary way. My new coloring-matter dyes chrome-mordanted wool a green color.

In the following examples I illustrate the nature of my invention and how it may be carried into effect; but I do not wish to be understood as considering it limited to these. The parts are by weight.

*Example 1.—Production of a bromin derivative of the product of Letters Patent No. 656,081.*—Make ten (10) parts of the mono-anilido-anthraquinone-mono-sulfo-acid, which may be prepared from anilin and a mixture of the alpha- and beta-mono-nitro-sulfo-acid of anthraquinone, according to the process described in Letters Patent No. 656,081, into a paste with two hundred (200) parts of water at the ordinary temperature, add eight (8) parts of bromin and stir well for twelve (12) hours, precipitate by means of salt brine, filter, and wash with salt brine. By changing the amount of bromin employed from eight (8) parts to twelve, (12,) sixteen, (16,) or thirty-two (32) parts bromin derivatives can be obtained which possess analogous properties. The same is true if I employ in the place of the mono-anilido-anthraquinone-mono-sulfo-acid of this example another mono-alphylido-anthraquinone-mono-sulfo-acid, such as described in the above-mentioned Patent No. 656,081.

*Example 2.—Production of a chlorin derivative of the product of Letters Patent No. 656,081.*—Mix ten (10) parts of the mono-para-toluido-anthraquinone-mono-sulfo-acid of Letters Patent No. 656,081 with one hundred (100) parts of glacial acetic acid and add two (2) parts of potassium chlorate. Now add slowly fifteen (15) parts of fuming hydrochloric acid, (containing thirty-three (33) per cent. of HCl.) The temperature of the mixture rises, and the operation is finished when evolution of hydrochloric-acid gas has diminished. The chlorin derivative may be collected by diluting the result with salt brine and filtering off the solid, which is the chlorin derivative. In place of the mono-para-toluido-anthraquinone-mono-sulfo-acid employed in this example I may employ another mono-alphyIido-anthraquinone-mono-sulfo-acid, such as described in the before-mentioned Letters Patent No. 656,081.

My new halogen compounds, which can be obtained as hereinbefore described, differ but little from one another. They dissolve in water, giving a red color, which may vary in shade from a cherry-red to a yellowish red. They dissolve in ethyl alcohol, giving a color within the range of yellow-red to brown-red. With concentrated sulfuric acid they give a color within the range of from olive to brown. In the dry and powdered state they are of a brown color and dye wool red to yellow-red.

The coloring-matter which I wish to particularly protect by this application for Letters Patent can be obtained from the hereinbefore-described new halogen compounds by suitable treatment with an aromatic amin, such as anilin, paratoluidin, &c.

*Example 3—Production of a coloring-matter from the bromin derivative of Example 1 by treating it with anilin.*—Mix one (1) part of brom-anilido-anthraquinone-mono-sulfo-acid, such as can be obtained according to Example 1 when using sixteen parts of bromin, with twenty (20) parts of anilin, boil the mixture until a blue-green melt is obtained and the color thereof no longer increases in intensity, allow the melt to cool, treat with dilute hydrochloric acid to extract the anilin, collect the coloring-matter by filtration, and wash it with cold water. A blackish-green coloring-matter is thus obtained which is with great difficulty soluble in cold water, somewhat more easily soluble in hot water, giving a blue solution. The solution turns somewhat greener upon addition of sodium carbonate or caustic soda. The dry coloring-matter dissolves in alcohol, giving a blue solution. It is insoluble in benzene. The solution in concentrated sulfuric acid is violet in color. It dyes chrome-mordanted and unmordanted wool green. In a similar way the other brominated or chlorinated products, such as can be obtained in accordance with the first and second examples, can be used to produce coloring-matters, and, further, in all cases other aromatic amins can be used instead of anilin.

*Example 4—Sulfonation of the coloring-matter obtained according to Example 3.*—To convert the coloring-matter obtained according to Example 3 into a more soluble sulfo-acid, add one (1) part of the dry coloring-matter to twenty (20) parts of sulfuric acid, (monohydrate,) slightly warm the mixture, and stir until the reaction product is readily soluble in cold water. Then pour the melt into water, precipitate the coloring-matter with common salt, filter, press, and dry, or preserve for use in the form of a paste. In this more soluble form my new coloring-matter is a blackish-green paste. It is soluble in water, giving a green solution, which hardly changes in color upon the addition of carbonate of soda or caustic-soda lye. It is slightly soluble in alcohol, giving a blue solution. It is insoluble in benzene. In concentrated sulfuric acid the solution is blue. It dyes chrome-mordanted and unmordanted wool strong green shades.

My new coloring-matters are distinguished from the hitherto-known products most closely resembling them in that they contain halogen.

Now what I claim is—

1. The process for the production of coloring-matters of the anthracene series which consists in treating a mono-alphylido-anthraquinone-mono-sulfo-acid with bromin then melting the halogen derivative so obtained with an aromatic amin and sulfonating the product so obtained substantially as described.

2. The process for the production of coloring-matters of the anthracene series which consists in treating a mono-alphylido-anthraquinone-mono-sulfo-acid with bromin then melting the halogen derivative so obtained with an aromatic amin substantially as described.

3. The process for the production of coloring-matters of the anthracene series which consists in treating a mono-alphylido-anthraquinone-mono-sulfo-acid with bromin all substantially as described.

4. As a new article of manufacture the new halogen derivatives of mono-alphylido-anthraquinone-mono-sulfo-acid such as can be obtained substantially as hereinbefore described and which dissolve in water giving a red color which may vary in shade from a cherry-red to a yellowish red and which dissolve in ethyl alcohol giving a color within the range from yellowish red to brown-red and in concentrated sulfuric acid giving a color within the range from olive to brown and which dye wool red to yellow-red, all substantially as described.

5. As a new article of manufacture the new coloring-matters of the anthracene series which can be obtained in a slightly-soluble and in a readily-soluble form and which in the former case are with difficulty soluble in cold water, more easily soluble in hot water giving a blue solution which turns somewhat greener upon the addition of sodium carbonate or caustic soda and which give a violet solution in concentrated sulfuric acid; which in the more soluble form are soluble in water giving a green solution which hardly changes in color upon the addition of carbonate of soda or caustic-soda lye, slightly soluble in alcohol giving a blue solution, and in concentrated sulfuric acid giving a blue solution: in both forms my new coloring-matters dye chrome-mordanted or unmordanted wool giving green shades and are further distinguished by containing halogen, all substantially as described.

In testimony whereof I have hereunto set my hand in the presence of two subscribing witnesses.

OSCAR BALLY.

Witnesses:
JOHN L. HEINKE,
PERCY J. JONES.